United States Patent [19]
Rider

[11] Patent Number: 5,893,597
[45] Date of Patent: Apr. 13, 1999

[54] TRUCK TRUNK

[75] Inventor: Philip W. Rider, Rt. 1 Box 51, Pomeroy, Wash. 99347

[73] Assignee: Philip W. Rider, Pomeroy, Wash.

[21] Appl. No.: 08/785,814

[22] Filed: Dec. 28, 1996

[51] Int. Cl.⁶ .................................................. B60R 9/06
[52] U.S. Cl. ............................................................ 296/37.6
[58] Field of Search .............................. 296/37.1, 37.6, 296/26.01, 26.08, 26.11, 24.1

[56] References Cited

U.S. PATENT DOCUMENTS

| | | | |
|---|---|---|---|
| 4,749,226 | 6/1988 | Heft | 296/37.6 |
| 4,828,312 | 5/1989 | Kinkel et al. | 296/37.6 |
| 5,207,469 | 5/1993 | Rossi | 296/37.6 |
| 5,253,913 | 10/1993 | Mitivier | 296/37.6 |
| 5,324,089 | 6/1994 | Schlachter et al. | 296/37.6 X |
| 5,435,616 | 7/1995 | Corner | 296/37.6 X |

*Primary Examiner*—D. Glenn Dayoan
*Assistant Examiner*—Jason Morrow

[57] ABSTRACT

A lightweight, 2-sided storage bin that slips easily in and out of the bed of a pickup truck, using the truck bed to form a complete enclosure. The two sides of the storage bin act as the back wall and as the hinged top of the bin. The storage bin folds upon itself for easy handling and storage.

1 Claim, 8 Drawing Sheets

TRUCK TRUNK

BACKGROUND OF THE INVENTION

1. Field of the Invention

1) This invention relates in general to removable cargo bins for storing items (such as groceries, supplies, tools, pets, etc.) in the bed of a pickup truck.

2. Description of the Prior Art

2) Items placed loosely in the bed of a pickup may slide around while the vehicle is being operated. As a result, items may be damaged, lost, or simply scattered about the bed. Loose items in a pickup bed may also present a safety hazard in the event the pickup accelerates or decelerates rapidly or is involved in a collision.

3) Prior inventions remedy this situation by providing a means for the user to restrain items within the pickup bed. However, some prior inventions (such as rigid cargo boxes) have been heavy, bulky, and difficult to install and remove. Other prior inventions (such as elastic cargo net systems) are not suitable for many types of cargo (such as pets and groceries).

SUMMARY OF THE INVENTION

The primary objective of the present invention is to provide a lightweight, fold-up, easy to install and remove storage compartment for use in pickup truck beds. The present invention is easy to place in the pickup bed when it is needed, may be quickly removed to allow essentially unimpeded use of the pickup bed, and folds upon itself to near-flat for easy storage and handling.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention, alterations and further modifications in the illustrated device, and further applications of the principles of the invention illustrated, as would normally occur to one skilled in the art to which the invention relates, is thereby intended.

Referring to FIG. 2, FIG. 3, FIG. 4 and FIG. 5, there is illustrated a storage bin 10, removably secured to pickup bed sides 100 and 101, and to pickup bed floor 102 through brackets 1, 2, 3, 4, 5 and 6. Secured in this manner, a storage area is created between the storage bin 10, pickup bed sides 100 and 101, pickup bed floor 102, and tailgate 103.

Storage bin 10 includes top panel 20, rear panel 40, and cover 60 (see FIG. 2), cover 60 being attached to top panel 20 and rear panel 40 , top panel 20 and rear panel 40 interconnected in a manner to allow rotation at the interconnection. Cover 60 is a suitable lightweight material such as, for example, cargo netting, with suitable provisions for mounting to top panel 20 and rear panel 40, such as, for example, fabric loops sewn onto the cover 60 perimeter edges.

Figure 8:
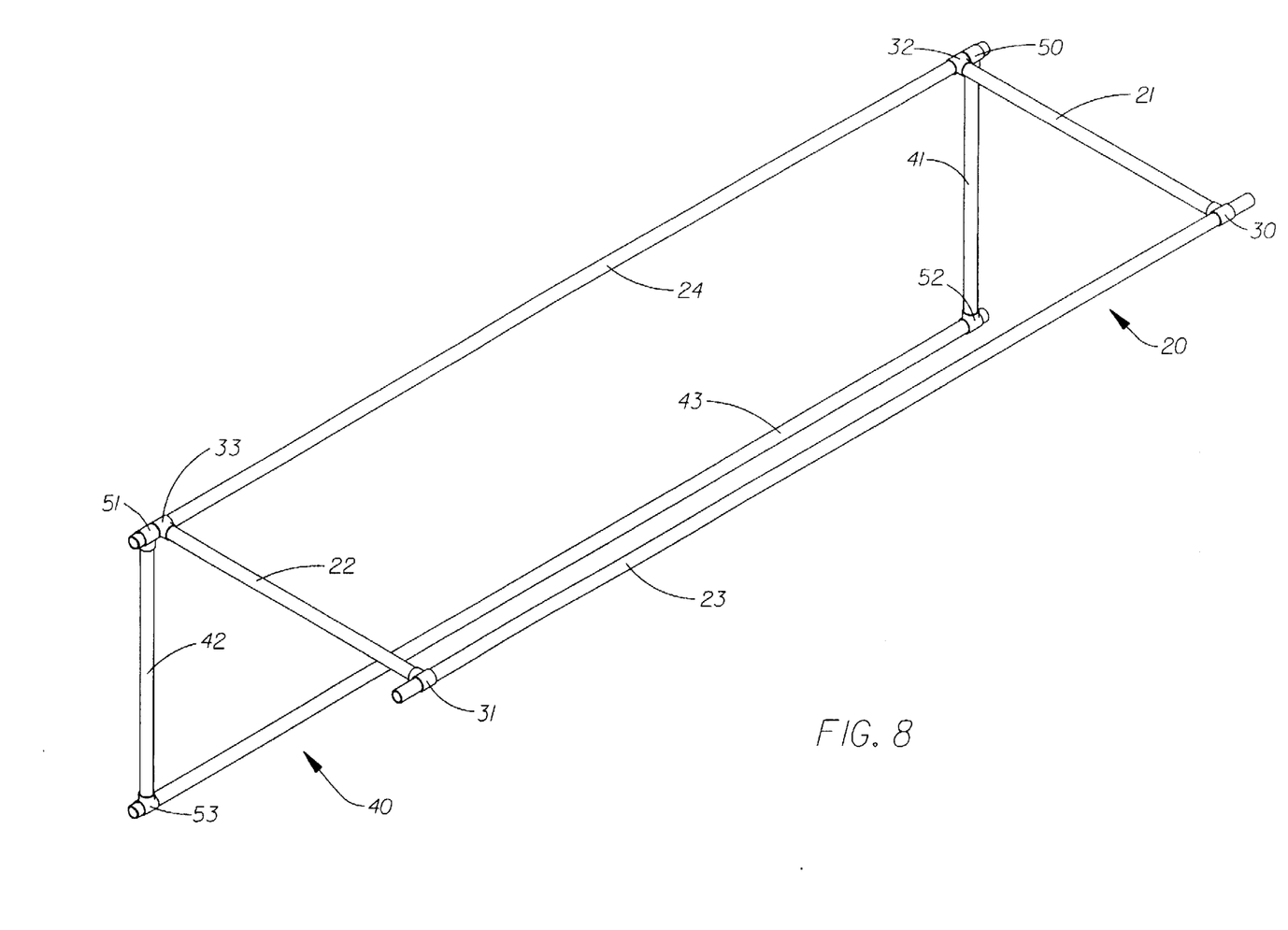
FIG. 8 is a perspective view of the cargo bin framing of the FIG. 1 embodiment.

Top panel 20 includes side members 21 and 22, front member 23, rear member 24, front fittings 30 and 31, and rear fittings 32 and 33 (see FIG. 8). Members 21, 22, 23 and 24 are rigid cylindrical members of a suitable material, such as, for example, thin wall aluminum tubing. Fittings 30, 31, 32 and 33 are rigid tee-shaped fittings of a suitable material such, for example, as aluminum. Side members 21 and 22 are connected to rear fittings 32 and 33 and front fittings 30 and 31, using a suitable metal to metal joining connection such as, for example, welding. Rear member 24 and front member 23 pass through rear fittings 32 and 33, and front fittings 30 and 31, respectively, and extend beyond the ends of the respective fittings to provide surfaces for engaging brackets 1, 2, 4 and 5. Rear member 24 and front member 23 are joined to rear fittings 32 and 33, and front fittings 30 and 31, respectively, using a suitable metal to metal joining method such as, for example, welding. Side member 21 is substantially equivalent in length and parallel to side member 22, rear member 24 is substantially equivalent in length and parallel to front member 23, and side members 21 and 22 are substantially perpendicular to front member 23 and rear member 24 such that top panel 20 is a substantially "square" assembly.

Rear panel 40 is comprised of side members 41 and 42, bottom member 43, top fittings 50 and 51, and bottom fittings 52 and 53 (see FIG. 8). Members 41, 42, and 43 are rigid cylindrical members of a suitable lightweight material such as, for example, thin-walled aluminum tubing. Fittings 50, 51, 52 and 53 are tee-typed fittings that join intersecting members in substantially the same plan and substantially perpendicular to one another (as applicable). Side members 41 and 42 are substantially equivalent in length and substantially parallel to one another. Bottom member 43 is substantially perpendicular to side members 41 and 42. Bottom member, 43 extends through and beyond bottom fittings 52 and 53 to provide surfaces to engage retaining brackets 3 and 6. Connections between top fittings 50 and 51 with side members 41 and 42, and connections between bottom fittings 52 and 53 with side members 41 and 42 and bottom member 43, are made using a suitable metal to metal joining method such as, for example, welding. Rear panel 40 joins to top panel 20 through top fittings 50 and 51, the inside diameter of top fittings 50 and 51 being slightly greater than the outside diameter of rear member 24, such that the ends of rear member 24 pass freely through top fittings 50 and 51, and thereby allow top panel 20 to rotate within top fittings 50 and 51 on rear panel 40.

Mounting bracket pairs 1 and 4, 2 and 5, and 3 and 6 (see FIG. 2, FIG. 3, FIG. 4, FIG. 5, and FIG. 7), are substantially equivalent to one another except they are of the opposite hand (mirror image) to one another. The mounting brackets are made of a sufficiently strong and flexible material such as, for example, thermoplastic. The brackets include flat bases with countersunk holes to allow the brackets to be secured to the pickup bed using appropriate fasteners, for example, threaded fasteners 121, 122, 123, 124, 125, 126, 127, 128, 129, 130, 131 and 132 (see FIG. 3, FIG. 4, and FIG. 5). The curved surfaces of the brackets deflect outward when the user pushes the cylindrical mating surfaces of storage bin 10 into the opening in the bracket, and the curved surfaces spring back to hold the storage bin 10 in place after the mating cylindrical surfaces have passed through the corresponding opening in the bracket.

Figure 1:
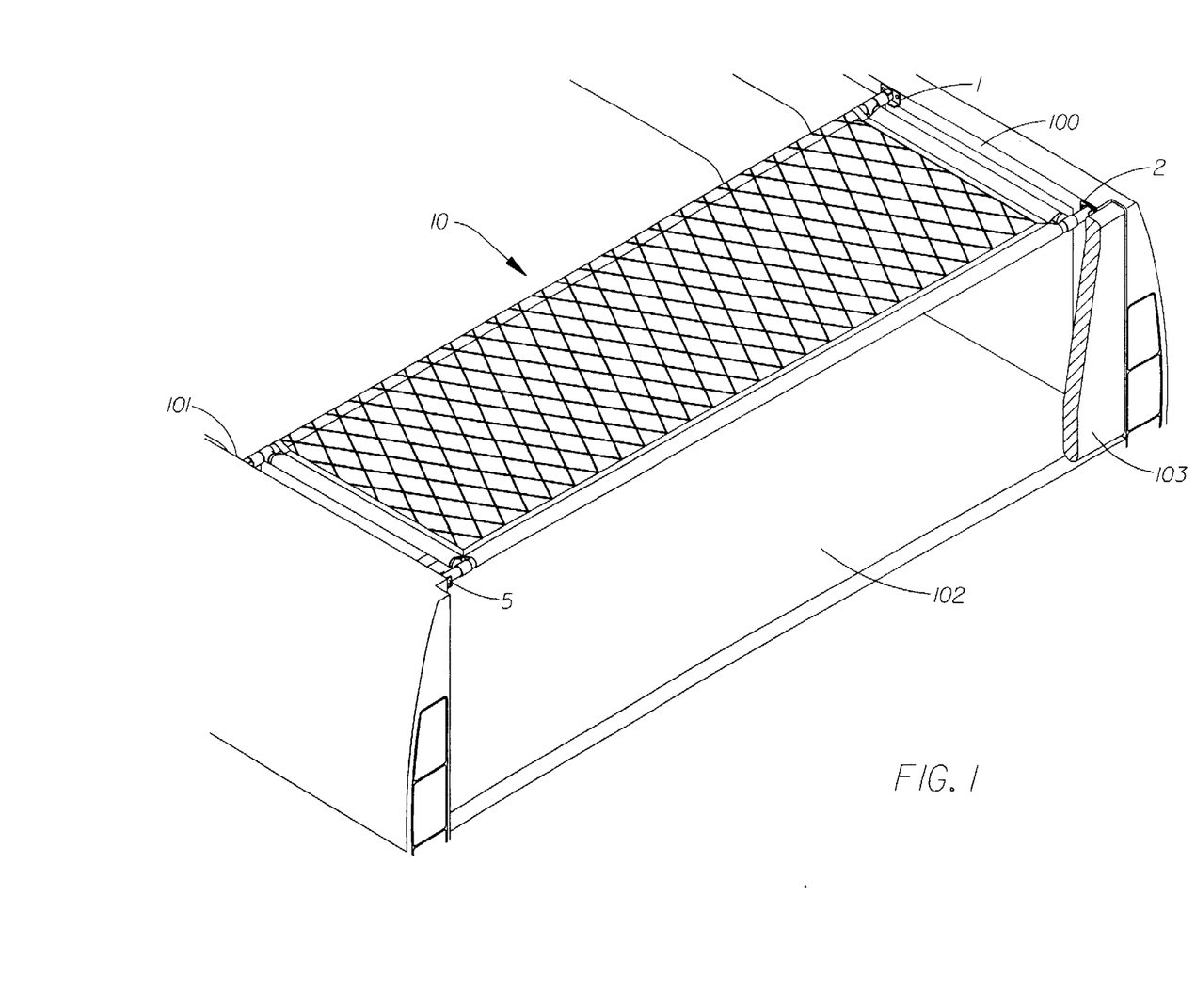
FIG. 1 is a perspective view of the invention according to a typical embodiment installed in the bed of a pickup truck.
Figure 2:
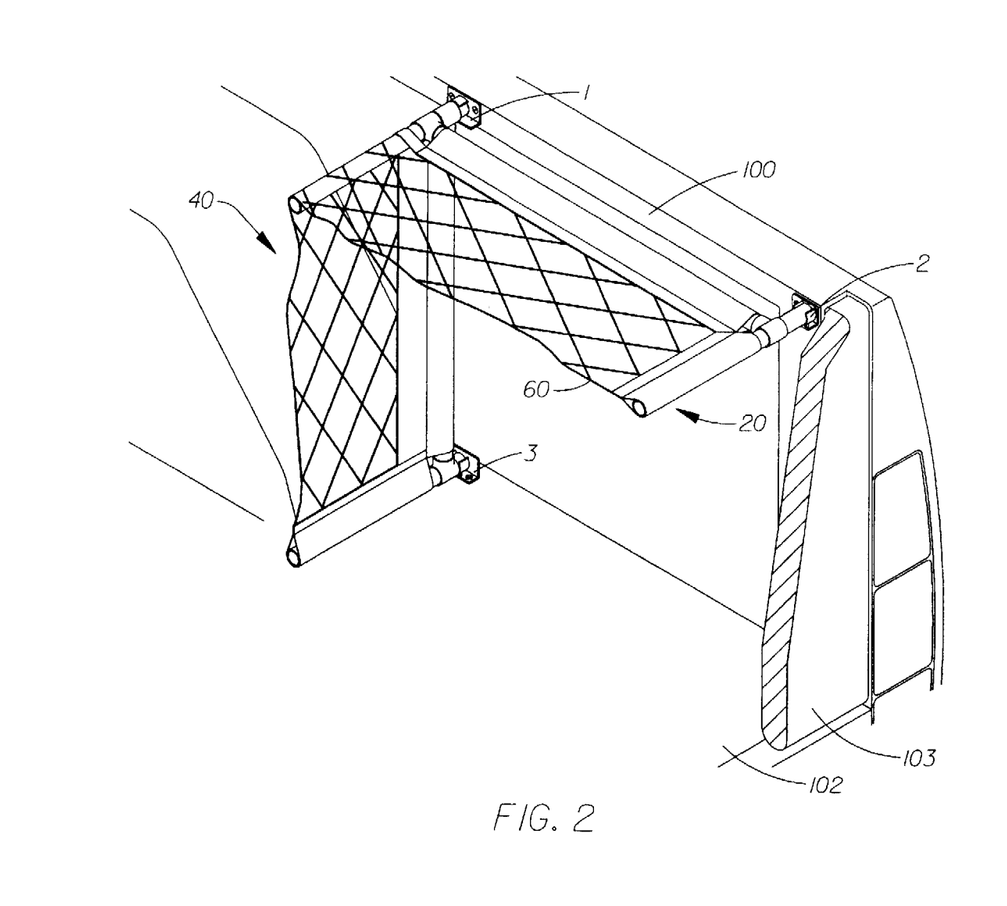
FIG. 2 is a partial perspective view of the FIG. 1 embodiment.
Figure 3:
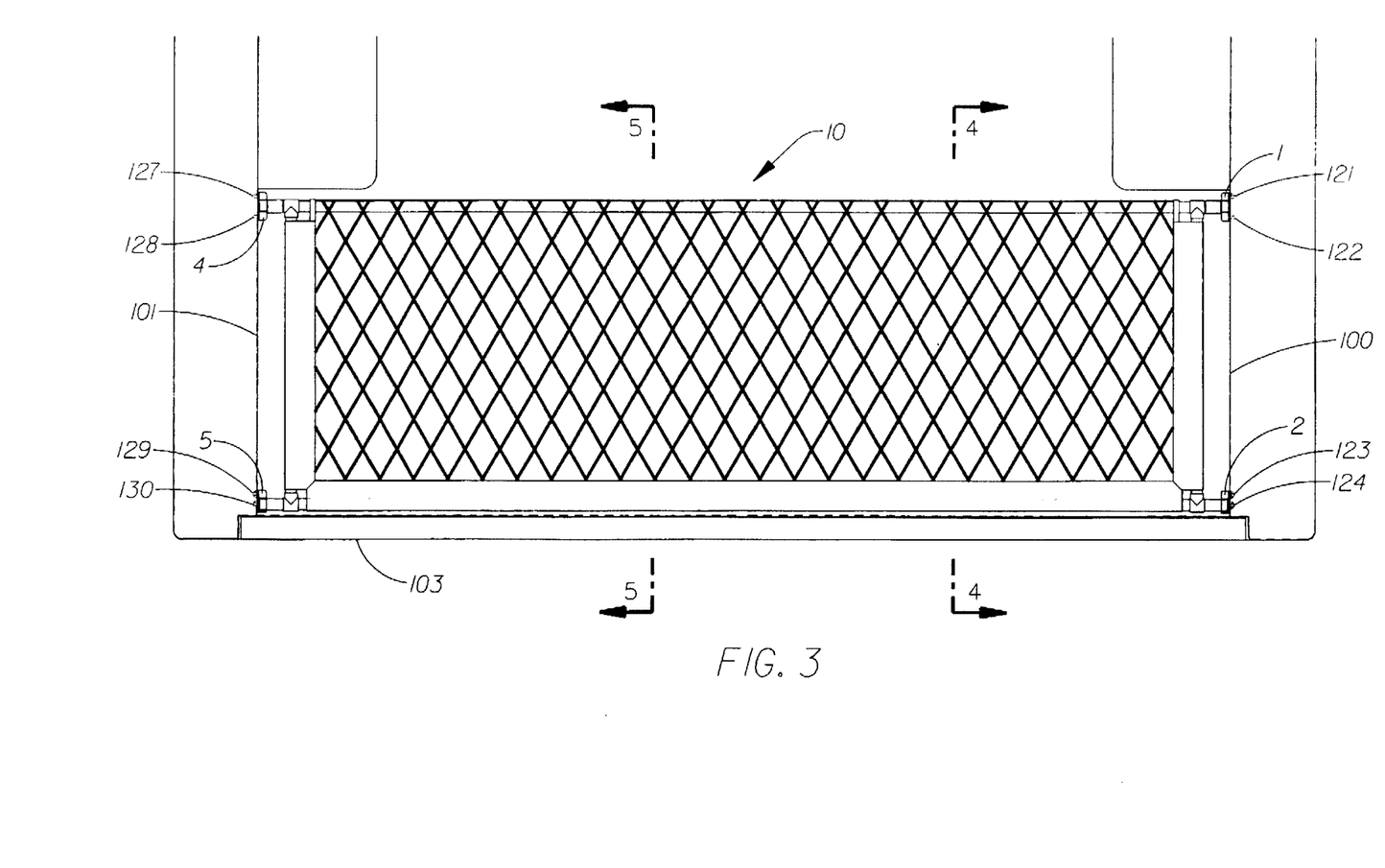
FIG. 3 is a top view of the FIG. 1 embodiment.
Figure 4:
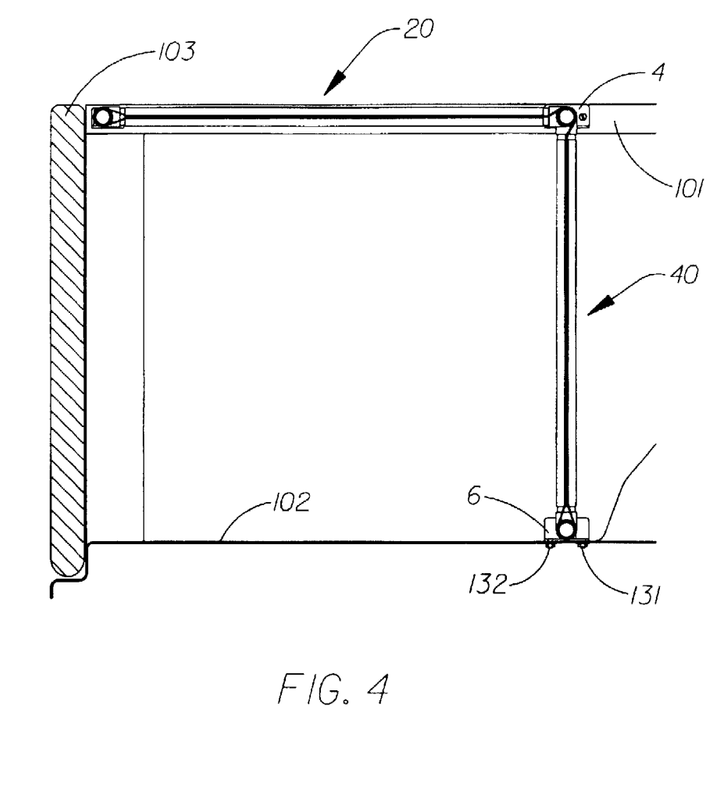
FIG. 4 is a section view of the FIG. 1 embodiment taken from FIG. 3 along line 4—4.
Figure 5:
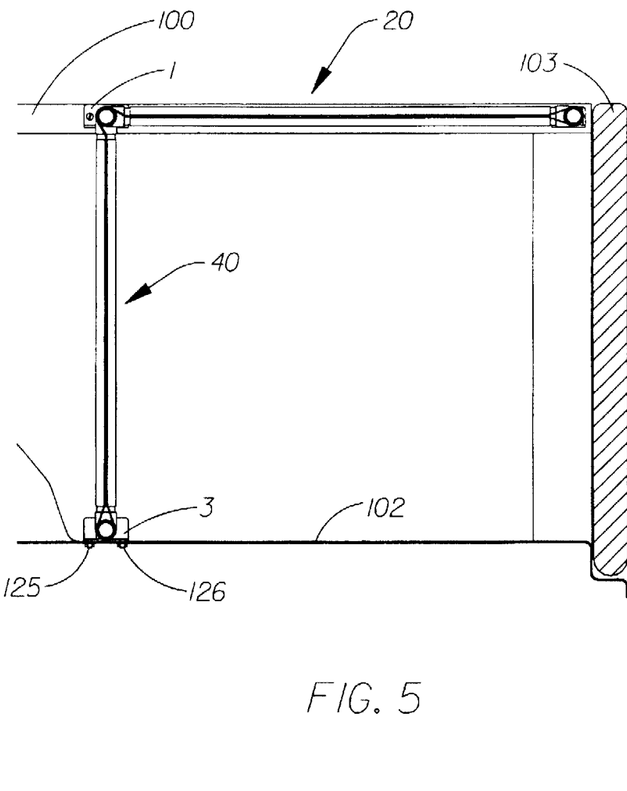
FIG. 5 is a section view of the FIG. 1 embodiment taken from FIG. 3 along line 5—5.
Figure 6:
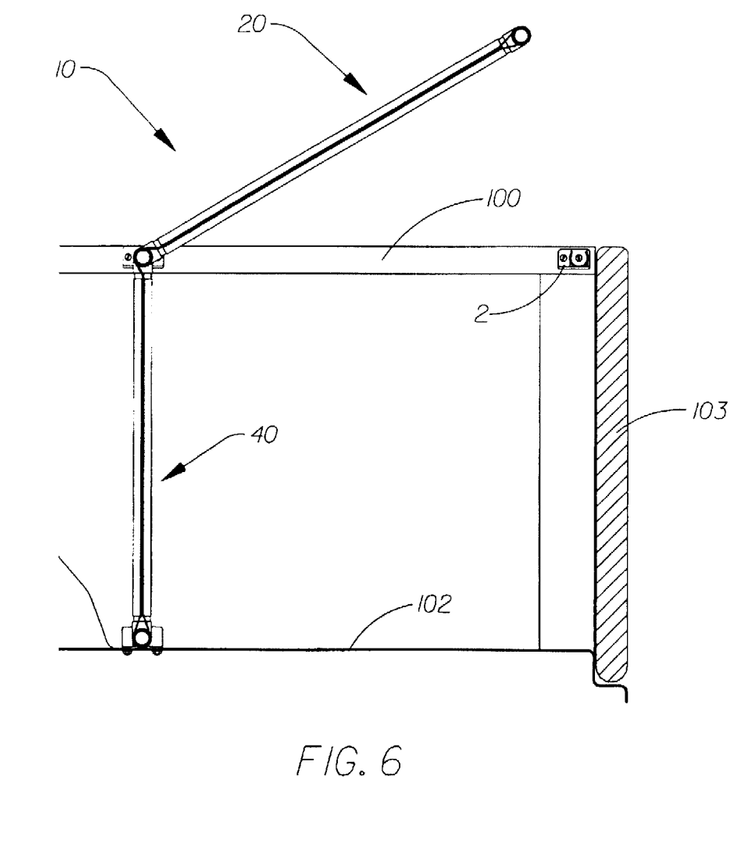
FIG. 6 is a section view of the FIG. 1 embodiment taken from FIG. 3 along line 4—4, with the top panel partially raised.
Figure 7:
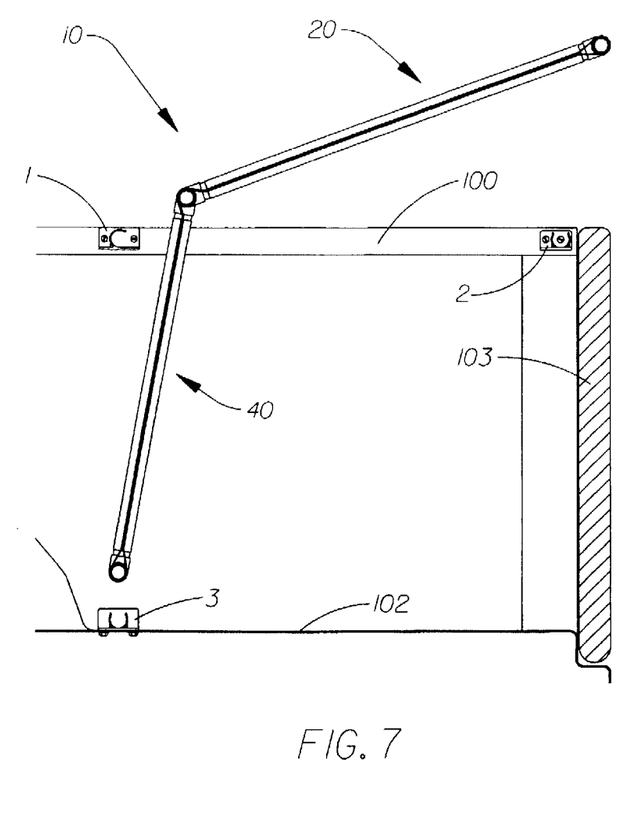
FIG. 7 is a section view of the FIG. 1 embodiment taken from FIG. 3 along line 4—4, with the cargo bin free from the mounting brackets.

With brackets 1, 2, 3, 4, 5 and 6 secure to the pickup truck bed, storage bin 10 may be installed by snapping the extreme outer ends of storage bin 10 into brackets 1, 2, 3, 4, 5, and 6. Start by placing bottom member 43 into brackets 3 and 6 (see FIG. 7). Then, rotate rear panel 40 towards the pickup cab until rear member 24 snaps into brackets 1 and 4 (see FIG. 6). Finally, snap front member 23 into brackets 2 and 5 (see FIG. 5). Reverse the process to remove storage bin 10.

Figure 9:
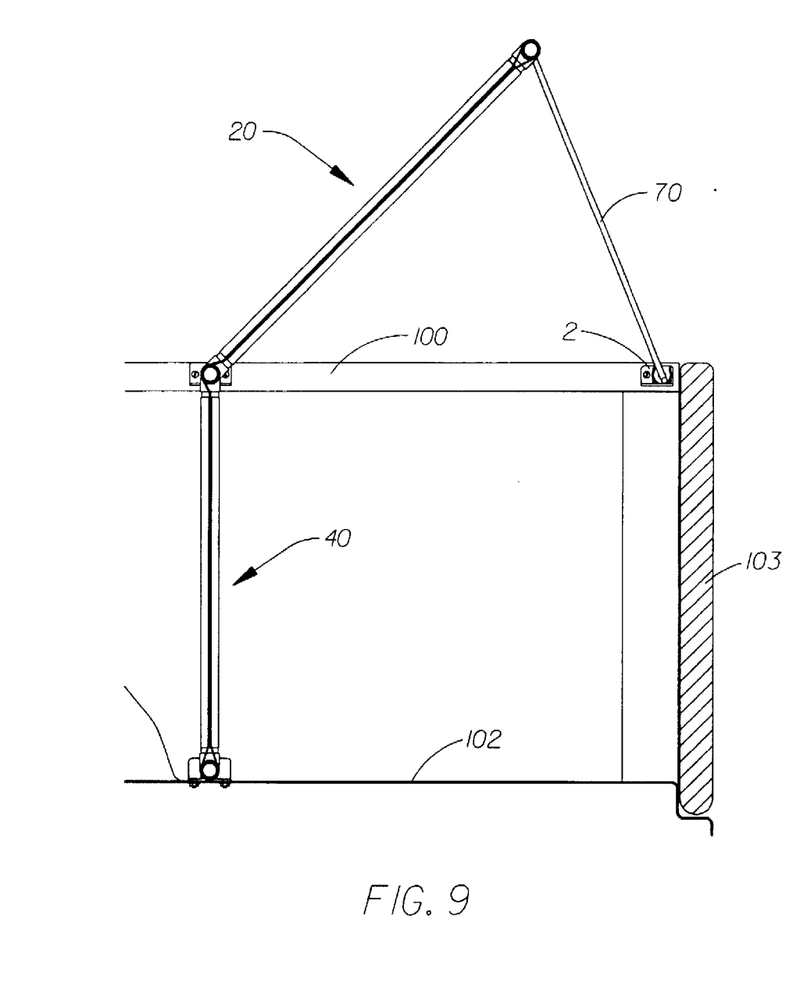
FIG. 9 is a section view of the FIG. 1 embodiment taken from FIG. 3 along line 4—4, showing an alternate form of the invention that includes a prop rod to hold the top panel in the raised position.
Figure 10:
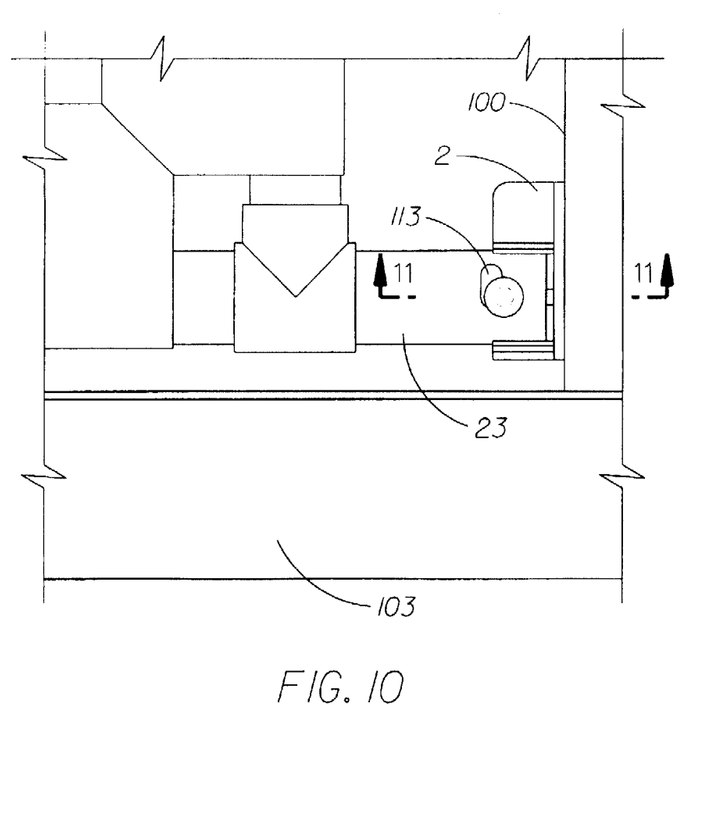
FIG. 10 is a partial top view showing an alternate means of attaching the FIG. 1 embodiment to a pickup truck bed.
Figure 11:
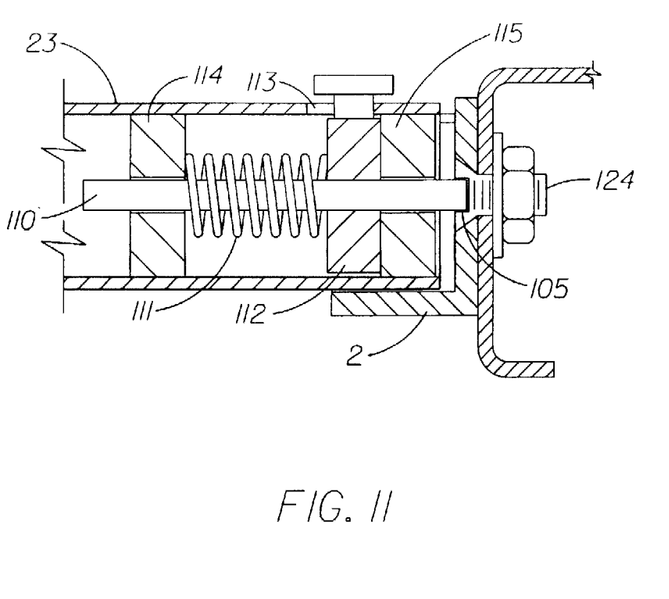
FIG. 11 is a section view of the FIG. 10 embodiment taken from FIG. 10 along line 11—11, showing an alternate means of attaching the FIG. 1 embodiment to the pickup truck bed.
Figure 12:
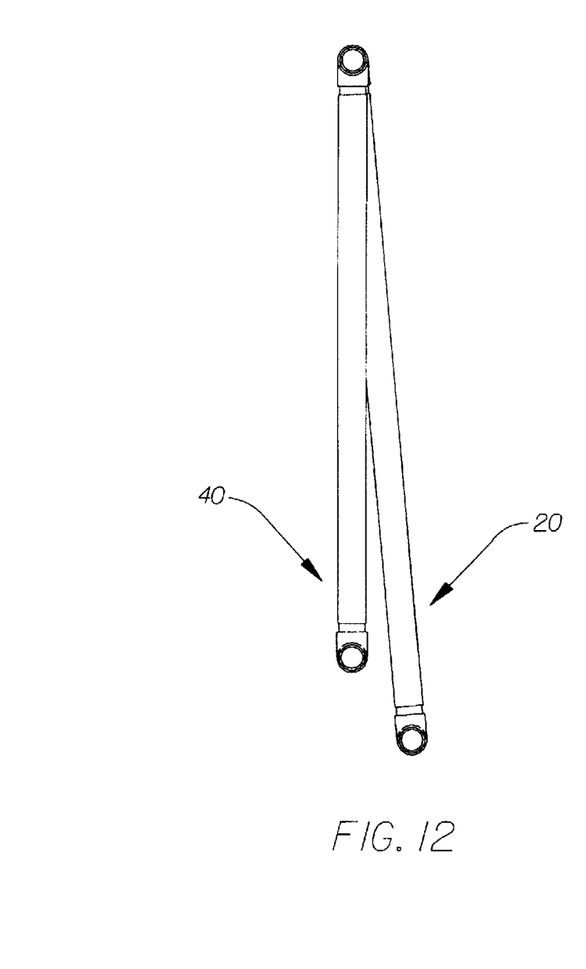
FIG. 12 is a side view of the FIG. 1 embodiment in the folded position.

Prop rod 70 may be used to prop top panel 20 in the upright position (see FIG. 9) when placing or removing items from the storage area. FIG. 10 and FIG. 11 illustrate alternate or additional means of securing front member 23 and/or rear member 24 of top panel 20 to pickup bed sides 100 and 101. The arrangements shown are intended to provide a more positive means of retaining top panel 20. The more positive connection may be beneficial for certain types of cargo such as, for example, pets. As shown in FIG. 11, pin 110 slides into recess 105 in fastener 124 or 130, or bracket 1 or 4. Pin 110, spring 111, retainer 112, guides 114 and 115, and slotted hole 113 are cooperatively arranged with each other and the outer ends of members 23 and/or 24, such that, at the users' discretion, pin 110 may be either spring loaded into hole 105 or retracted and held in the pocket at the end of slotted hole 113, without yielding spring 111. Retainer 112 and guides 114 and 115 shall be a suitable low coefficient of friction material such as, for example, polyethylene plastic, and shall be secured within members 23 and/or 24 using a suitable joining method such as, for example, a press fit with crimp.

What is claimed is:

1. A lightweight, removable storage bin for use in combination with a pickup truck bed having right and left side walls, front side wall, rear tailgate having raised and lowered positions, and a floor, said side walls and said rear tailgate having top edges being substantially coplanar with each other, said floor being substantially parallel to said top edges of said side walls and tailgate, said storage bin comprising:

a) adjacent panel members one and two, positioned within said pickup truck bed, said panel member one extending between said right and left side walls and extending from said top edge of said rear tailgate toward said front side wall, said panel member one being substantially adjacent and substantially parallel to the plane of said top edges of said side walls and said tailgate, said panel member two being essentially parallel to said rear tailgate when said tailgate is in the raised position, said panel member two being offset from said rear tailgate by the distance at which said panel member one extends towards said front side wall, said panel member two extending from said panel member one to said floor, said panel member one having a front edge member adjacent to said rear tailgate and right and left edge members intersecting and perpendicular to said front edge member, said panel member two having a top edge member adjacent to said right and left edge members of said panel member one and a bottom edge member adjacent to said floor, said panel member two having left and right edge members intersecting and perpendicular to said top and bottom edge members, said panel members having barrier material connecting to said edge members and spanning across said panel members;

b) means for hingedly securing said right and left edge members of said panel member one to said top edge member of said panel member two;

c) means of securing said panel members one and two to said pickup truck bed, said means comprising:
  1. brackets, said brackets being secured to said right and left side walls and said floor at locations corresponding to each end of said front edge member and each end of said top and bottom edge members, each said bracket having a substantially flat surface for mating with said side walls and said floor and a C-clip to removably retain said front, top and bottom edge members;
  2. spring-loaded pins and brackets, said brackets having pin-retaining holes, said spring loaded pins being substantially retained within each end of said front, top and bottom edge members, said pins being spring-loaded to extend a portion of each said pin beyond the end of each said front, top and bottom edge member and into the said pin-retaining holes in said brackets, each said pin having means to retract said extended portion of said pin from said pin-retaining hole and into the end of said edge member, said means of retracting said pins disengaging said extended portion of said pins from said pin-retaining holes in said brackets.

* * * * *